Sept. 29, 1953     H. P. HOOPES     2,653,370
EJECTION MOLDING APPARATUS

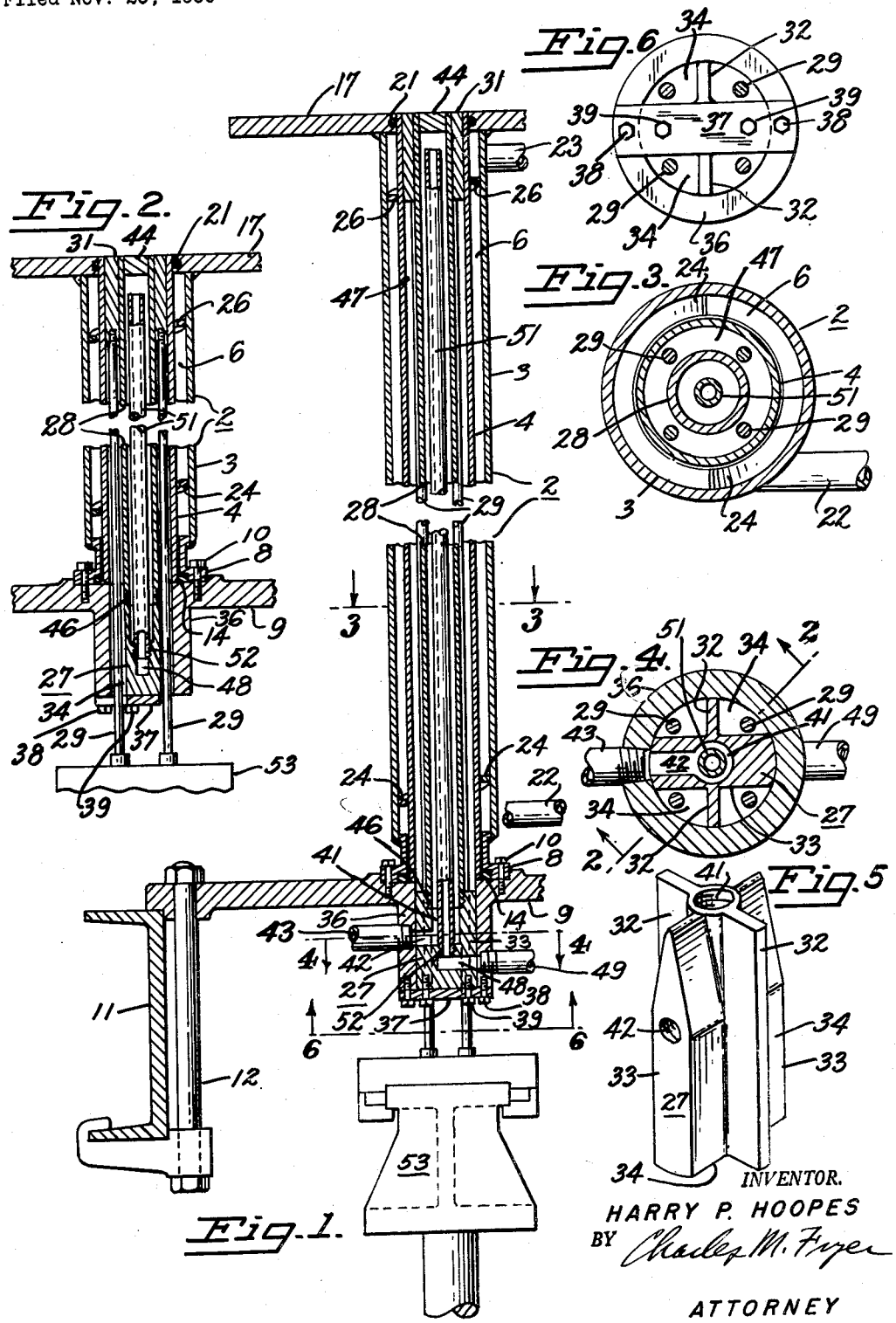

Filed Nov. 25, 1950                               2 Sheets-Sheet 2

INVENTOR.
HARRY P. HOOPES
BY
ATTORNEY

Patented Sept. 29, 1953

2,653,370

UNITED STATES PATENT OFFICE 2,653,370

EJECTION MOLDING APPARATUS

Harry P. Hoopes, Berkeley, Calif., assignor to Pabco Products Inc., San Francisco, Calif., a corporation of Delaware Application November 25, 1950, Serial No. 197,579

10 Claims. (Cl. 25—120)

This invention relates to molding apparatus, and more particularly to such apparatus adapted for the molding of light weight insulating material from an aqueous slurry of the same, such as magnesia insulation or insulation shaped from a slurry containing reactable calcareous-silicious materials, and more particularly to a special structure adjacent the bottom end of the mold to permit drainage of slurry from the mold so as to obviate incrustation which would interfere with the movement of piston actuating rods passing through such structure.

Insulating materials of the type described which are particularly adapted for use with the molding apparatus of this invention are disclosed in assignee's Patent No. 2,209,754, dated July 30, 1940, for the production of magnesia insulation, and Patents Nos. 2,432,981, dated December 23, 1947, and 2,483,498, dated October 4, 1949, for the production of insulation made by the reaction of calcareous and silicious materials. In the methods of these patents, the slurry is poured into a mold cavity, and the mold is heated to set the slurry to a firm self-supporting mass in a relatively short time, after which the set mass is ejected from the mold in self supporting form. In the case of magnesia insulation, the set mass is then dried, while in the case of the reactable calcareous-silicious insulation, it is indurated and then dried.

In the manufacture of tubular pipe covering, the mold comprises a jacket formed of an outer shell and an inner mold liner; heating fluid being circulated through the jacket space between the shell and the liner. A hollow mold core or mandrel is positioned within the liner and spaced therefrom to provide a cylindrical mold cavity between the liner and the core. Heating fluid is also circulated through the core; and a piston is provided to eject the set material from the mold cavity. The piston is actuated by rods which extend through a closure member at the lower end of the mold cavity.

Summarizing this invention, it comprises a special structure of the aforementioned closure member which is such as to prevent incrustation from affecting free movement of the piston actuating rods through the member, thereby obviating damage to the mold, or relatively frequent replacement of parts. This is accomplished by providing drainage passages in the closure member through which the piston actuating rods extend, which are large enough in comparison to the diameter of the rods to provide ample clearance for drainage of slurry through such passages. Incrustation forms rapidly when the mold may be used alternately for molding magnesia insulation and the calcareous-silicious insulation, because these two different materials when employed in the same mold enter into a chemical reaction resulting in hard incrustation. Objects of the invention will become apparent from a perusal of the following description thereof.

Referring to the drawing:

Fig. 1 is a vertical sectional view through a portion of one embodiment of the molding apparatus of this invention in which the aforementioned drainage passages are provided in a special fluid distributing member; the view being broken away to shorten the same;

Fig. 2 is a view similar to Fig. 1 taken in a plane at a 45° angle to Fig. 1 as indicated by section line 2—2 in Fig. 4; portions of the structure being omitted from the view and portions being shown broken away to illustrate more clearly the construction;

Fig. 3 is a horizontal section taken in a plane indicated by line 3—3 in Fig. 1;

Fig. 4 is a horizontal section taken in a plane indicated by line 4—4 in Fig. 1;

Fig. 5 is an isometric view of the fluid distributing member employed at the lower end of the mold;

Fig. 6 is a bottom sectional elevation taken in a plane indicated by line 6—6 in Fig. 1;

Figure 7:
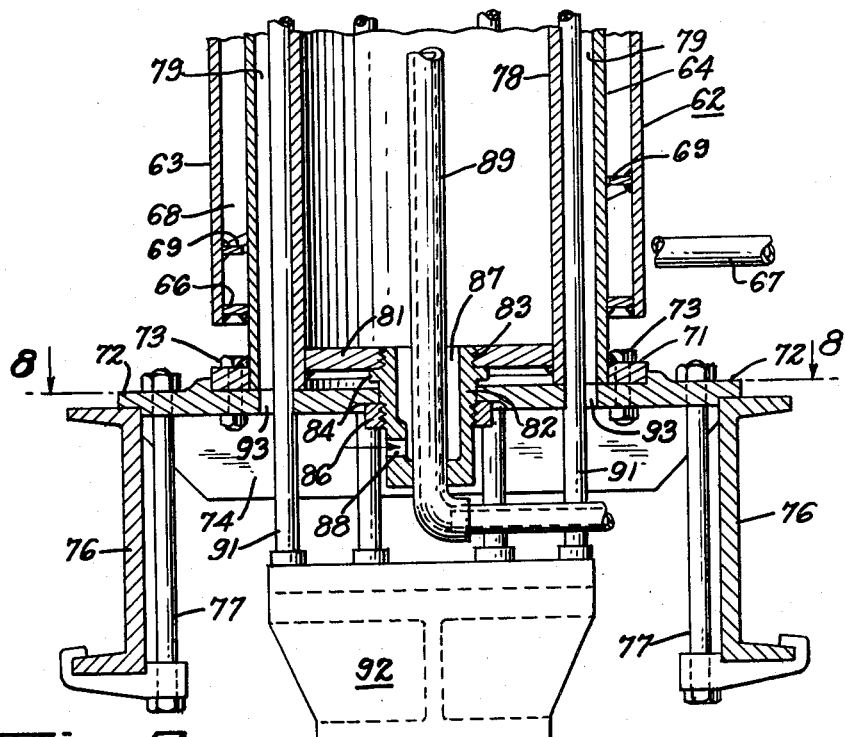
Fig. 7 is a fragmentary vertical sectional view through the lower portion of another embodiment of the molding apparatus of this invention.

As is disclosed in applicant's co-pending application, Serial No. 191,696, filed October 23, 1950, for Molding Apparatus, which describes in detail the general mold structure with the exception of the special fluid distributing member incorporated in the modification of Figs. 1 through 6, the mold of such modification comprises a jacket 2 which includes outer shell 3 and inner mold liner 4 removably telescoped within shell 3, both of which are tubular shaped in the form of cylinders. A jacket space 6 is formed between shell 3 and liner 4 for circulation of a heating fluid, such as hot water, therethrough. Shell 3 has a peripheral flange 8 detachably connected to a base plate 9 by cap screws 10; the base plate being in turn detachably supported on beams 11 by clamping structures 12.

An annular flange 14 at the lower end of liner 4 seats in a recess in the bottom end of shell 3 so that when the liner is telescoped within the shell, flange 14 is clamped between plate 9 and the lower end of the shell. A suitable sealing gasket is clamped between flange 14 and the lower end of the shell to seal against escape of the heating fluid from the lower end of the mold. At its upper end, shell 3 is secured to a plate 17 which forms part of the hopper (not shown) frame structure, and which also provides a closure at the top end of the shell covering jacket space 6 between the shell and the liner.

The upper end of liner 4 has a sliding fit in an aperture in plate 17; and a conventional O-ring seal 21 is provided between plate 17 and the upper end of the liner, to seal against escape of heating fluid from the upper end. Although, the liner of the mold is shown removably mounted to provide the advantages explained in said aforementioned co-pending application, it may be formed as a structurally integral unit with shell 3.

A hot water inlet pipe 22 is connected to shell 3 adjacent the lower end thereof, and an outlet pipe 23 for the hot water is also tangentially connected to the shell adjacent the upper end thereof. To effect through circulation of the water, a plurality of spirally arranged vanes 24 are provided above inlet pipe 22; and similar vanes 26 are also provided below outlet pipe 23.

Fluid distributing member 27 is provided below the mold to form a mounting for an inner core or mandrel 28 of the mold, and also a means for permitting circulation of heating fluid through such core, and at the same time permit free passage therethrough of actuating rods 29 for effecting movement of a cylindrical mold ejection piston 31. As can be seen from Fig. 5, member 27 is spider-shaped in cross section, and includes a pair of radially projecting flanges 32 at diametrically opposite points, and another pair of radially projecting flanges 33 also at diametrically opposite points. Flanges 33 are wider than flanges 32 to provide room for passages in a manner to be subsequently explained, for the purpose of permitting circulation of water; the narrower flanges 32 being primarily centering flanges.

The arrangement of the flanges is such that relatively wide radially open spaces or passages 34 are formed therebetween, providing ample clearance for actuating rods 29 so that the slurry may drain freely through said passages. The outer or side edges of radial flanges 32 and 33 are in the form of arcs of a circle, to enable member 27 to have a sliding fit within a cylindrical sleeve 36 fixed to the underside of base plate 9. A keeper bar or plate 37 of substantially the same width as flanges 33 is provided to hold member 27 within sleeve 36; the keeper plate being secured to sleeve 36 by cap screws 38, and member 27 being secured to the keeper plate by cap screws 39. It will be noted that keeper plate 37 does not block drainage through passages 34.

A fluid inlet passage 41 is provided in member 27, open at its upper end to the inside of mold core 28 and having a lateral extension 42 through one of the wide radial flanges 33 and which is open to the side edge of such flange. Passage portion 42 communicates with an inlet aperture in sleeve 36 in which is connected a fluid inlet pipe 43. Core 28 is hollow, being closed at the top by plug 44; and its lower end is detachably connected to fluid distributing member 27, in communication with passage 41, by means of screw threaded connection 46. A cylindrical mold cavity 47 is thus formed between the outer surface of core 28 and the inner surface of liner 4; and fluid distributing member 27 is at the lower end of the mold cavity.

In the radial flange 33 opposite the flange containing lateral passage 42, is formed a fluid outlet passage 48 located below passage 42 and open to the side edge of the flange; outlet passage 48 communicating with fluid outlet pipe 49 connected in sleeve 36. A pipe 51 has a detachable screw threaded connection 52 in member 27, and is in communication with outlet passage 48 in such member; the upper end of pipe 51 extending to a position adjacent the top of the mold. Thus, heating fluid introduced into the mold core 28 is circulated upwardly into the core, and can flow out through pipe 51 and outlet pipe 49 which may be connected to jacket inlet pipe 22.

Previously mentioned piston actuating rods 29, which are connected at their upper ends to the cylindrical ejection piston 31 in cylindrical mold cavity 47, extend through the respective drainage passages 34 between the radial flanges of fluid distributing member 27, and are connected at their lower ends to a cross-head 53 of suitable piston actuating mechanism. In filling the mold with the slurry to be set, the piston actuating mechanism is moved so that piston 31 is at the lower end of the mold; and after the material has set to a firm self supporting mass, it can be readily ejected endwise from mold cavity 47 by movement of the piston upwardly.

Because of the relatively wide passages 34 between the radial flanges of fluid distributing member 27 which otherwise provides a closure for the mold cavity 47, the aqueous slurry which may escape past piston 31 in the lowermost position thereof when the mold is first being filled, can readily drain through such passages; and ample clearance obtains for the rods 29. Therefore, any incrustation of such slurry which may form, will not interfere with free movement of the piston actuating rods 29, as would otherwise be the case if such rods were slidable in passages of substantially the same diameter of those of the respective rods. As was previously pointed out, the incrustation occurs to a marked extent when the mold is operated alternately for molding of magnesia insulation and insulation made from the reaction of calcareous and silicious materials because of a chemical reaction which occurs between these two different types of material. Hence, the described fluid distributing member construction obviates a serious problem.

Although in the embodiment of the invention illustrated, spider member 27 is provided with four radial flanges to provide for passages for four piston actuating rods, it is to be understood that the same principle of construction may be employed in molds of larger diameter, if so desired, where more than four circumferentially arranged piston actuating rods may be employed to eject the material from the mold.

Figure 8:
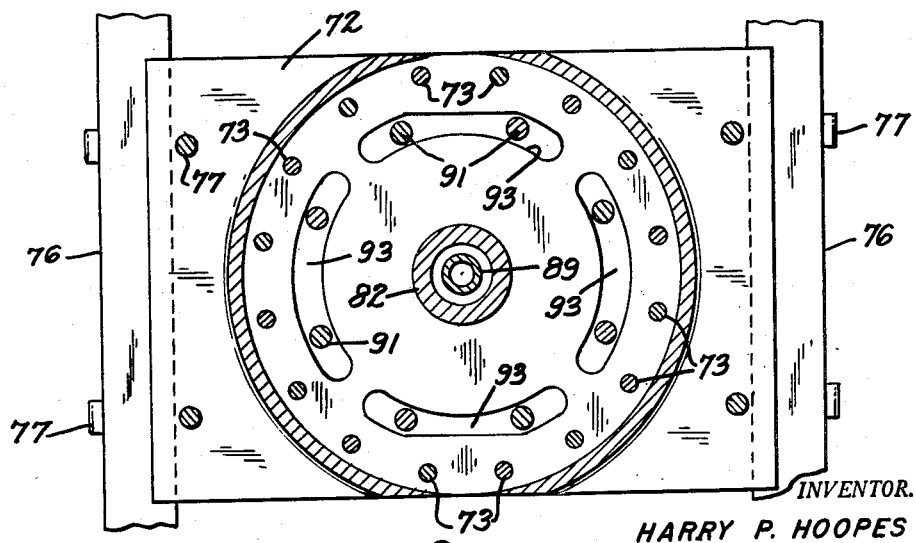
Fig. 8 is a horizontal sectional-elevation taken generally in a plane indicated by line 8—8 in Fig. 7.

The construction of Figs. 1 through 6 is particularly adapted for molds of relatively small diameter; and although such construction may be employed for larger diameter molds, a preferred embodiment for larger diameter molds is illustrated in Figs. 7 and 8. In such embodiment, the mold arrangement is substantially the same as that previously described comprising mold jacket 62 including outer cylindrical shell 63 and cylindrical liner 64 which is shown fixedly secured to shell 63 by means including a ring 66 welded to both the shell and the liner. Heating fluid inlet pipe 67 provides means for introduction of the heating fluid into jacket space 68 in the manner previously related; and as with respect to the previously described modification, spirally arranged vanes 69 are provided to effect thorough circulation of the heating water. The lower end of the mold structure is only shown in Fig. 7, to conserve space; it being understood that the construction above the portion shown is the same as that previously described.

Liner 64 is provided with peripheral flange 71 at the lower end thereof which is detachably mounted on base plate 72 by bolts 73; the underside of the base plate being provided with suitable reenforcing flanges 74. Base plate 72 is secured to supporting beams 76 by clamping structures 77.

Mold core or mandrel 78 is supported directly on base plate 72 and forms cylindrical mold cavity 79 between it and liner 64; the base 72 underlying the lower end of the mold cavity so as to form normally a closure member therefor. A centrally apertured plate 81 is welded adjacent the lower end of core 78; and the core is secured to base plate 72 by means including fluid distributing member 82 which is screwed at 83 in plate 81 with the underside of plate 81 abutting against a peripheral shoulder 84 on the fluid distributing member. A nut 86, at the underside of base plate 72, is screwed onto fluid distributing member 82 to clamp core 78 against the base plate.

Fluid distributing member 82 has fluid inlet passage 87 open at the top thereof to permit introduction of heating fluid into the inside of core 78; and such fluid inlet passage 87 is also open at the side of fluid distributing member 82 through aperture 88 which is connected to a source of heated fluid supply in the manner previously described. Outlet pipe 89 for conducting the heated fluid from the inside of core 78, extends through passage 87 and through the fluid distributing member on which the pipe is mounted, to thus provide for the circulation of the heating fluid through the inside of mold core 78.

Piston actuating rods 91 are connected to actuating cross-head 92 and are movable longitudinally in mold cavity 79 to effect ejection of the molded material by means of the piston (not shown in Fig. 7) in the manner previously described. These rods pass with clearance through drainage passages 93 formed in base plate 72 to permit drainage of the slurry for the purpose described. As can be seen more clearly from Fig. 8, a plurality of arcuately shaped drainage passage 93 is provided in the base plate, and a pair of the piston actuating rods passes with clearance through each passage. In operation, when the slurry is to be set in either of the modifications of Figs. 1 through 6, or Figs. 7 and 8, the mold cavities 47 and 79, respectively, are completely filled with slurry with the ejection piston at the lower end of the mold. While the piston is maintained in this position, the mold is heated to set the slurry to a firm self-supporting mass by circulation of heating fluid, such as hot water, through respective jacket spaces 6 and 68. This results in thorough heating of the outer side of the slurry. The inner side of the slurry is also maintained heated during the setting thereof in the mold by introduction of heating fluid into respective hollow mold cores 28 and 78.

After the slurry is set to a firm self supporting mass, the set product is then ejected from the upper end of the mold by movement of the respective actuating rods 29 and 91 upwardly to move the ejection piston upwardly. Upon ejection of the set product, the mold is ready for the next cycle of operation.

The described type of mold is particularly adapted for the molding of aqueous slurries of magnesia or reactable calcareous-silicious insulation. The products of these respective slurries, enter into a chemical reaction when brought together, which would normally cause relatively rapid incrustation in the passages 34 in fluid distributing member 27, or the passages 93 in the plate 72 if the piston actuating rods were piloted in these passages. However, since such passages are wide enough to provide ample free open space for the actuating rods, they serve as drainage passages to allow slurries to drain freely therethrough, thus obviating such incrustation, and consequent damage to the mold, or relatively frequent replacement of parts.

I claim:

1. Molding apparatus comprising a tubular mold member, a hollow mold core extending into and spaced from said mold member to provide a mold cavity between it and the member; a closure structure adjacent an end of said member and said mold core, and including a base and a fluid distributing member mounted on said base; said closure structure having a plurality of drainage passages therein adjacent an end of said mold cavity; means for circulating fluid through said core comprising a fluid inlet passage in said distributing member in communication with the inside of said mold core, and an outlet pipe on said fluid distributing member extending into the inside of said core; and means for ejecting molded material from said mold cavity comprising a piston slidably mounted in said mold cavity, and a plurality of actuating rods connected to said piston and extending through said drainage passages; said drainage passages being materially wider throughout their length than the width of the actuating rods to provide ample open space clearances between said passages and said rods for unobstructed flow of fluid therethrough.

2. Molding apparatus comprising a tubular mold member, a hollow mold core within said tubular mold member spaced therefrom to provide a mold cavity between it and the member, a fluid distributing member adjacent an end of the mold cavity and on which said core is mounted, said fluid distributing member having fluid circulating passages therein communicating with said mold core and also drainage passages; one of said circulating passages being in communication with said mold core through a pipe mounted in said fluid distributing member and extending into said core; and means for ejecting molded material from said mold cavity comprising a piston slidably mounted in said mold cavity, and a plurality of actuating rods connected to said piston and extending through said drainage passages, said drainage passages being materially wider throughout their length than the width of the actuating rods to provide ample open space clearances between said passages and said rods for unobstructed flow of fluid therethrough.

3. Molding apparatus comprising a tubular mold member, a hollow mold core within said tubular mold member spaced therefrom to provide a mold cavity between it and the member, a fluid distributing member on which said core is mounted, said fluid distributing member having fluid circulating passages therein and also radial flanges forming radially open drainage passages between said flanges; and means for ejecting molded material from said mold cavity comprising a piston slidably mounted in said mold cavity, and a plurality of actuating rods connected to said piston and extending through said radially open drainage passages.

4. Molding apparatus comprising a tubular mold member, a hollow mold core within said tubular mold member spaced therefrom to provide a mold cavity between it and the member, a fluid distributing member upon which an end of said core is mounted, said fluid distributing member having radial flanges forming radially open drainage passages between said flanges; means for circulating fluid through said core comprising a fluid inlet passage in said fluid distributing member open to the top thereof and to the side edge of a radial flange of said member, a fluid outlet passage open to the side edge of a radial flange of said member, and a pipe mounted on said member in communication with said outlet passage and extending into the inside of said core; and means for ejecting molded material from said mold cavity comprising a piston slidably mounted in said mold cavity, and a plurality of actuating rods connected to said piston and extending through said radially open drainage passages.

5. Molding apparatus comprising a tubular mold member, a hollow mold core within said tubular mold member spaced therefrom to provide a mold cavity between it and the member, a fluid distributing member upon which an end of said core is mounted, a sleeve about said fluid distributing member, said fluid distributing member having radial flanges forming radially open drainage passages between said flanges; means for circulating fluid through said core comprising a fluid inlet passage in said fluid distributing member open to the top thereof and to the side edge of one of said radial flanges of said member and in communication with a fluid inlet aperture in said sleeve, a fluid outlet passage open to the side edge of another radial flange of said member and in communication with an outlet aperture in said sleeve, and a pipe mounted on said member in communication with said outlet passage and extending into the inside of said core; and means for ejecting molded material from said mold cavity comprising a piston slidably mounted in said mold cavity, and a plurality of actuating rods connected to said piston and extending through said radially open drainage passages.

6. Molding apparatus comprising a base; a jacket positioned on said base including an outer substantially cylindrical shell and a substantially cylindrical mold liner within said shell, said shell having an opening for introduction of fluid into the jacket; a sleeve on said base under said jacket; a fluid distributing member in said sleeve; a hollow mold core mounted on said member and extending into and spaced from said liner to provide a mold cavity between it and the liner, said fluid distributing member having radial flanges forming radially open drainage passages between said flanges; means for circulating fluid through said core comprising a fluid inlet passage in said fluid distributing member open to the top thereof and to the side edge of one of said radial flanges of said member and in communication with a fluid inlet aperture in said sleeve, a fluid outlet passage open to the side edge of another radial flange of said member and in communication with an outlet aperture in said sleeve, and a pipe mounted on said member in communication with said outlet passage and extending into the inside of said core; and means for ejecting molded material from said mold cavity comprising a piston slidably mounted in said mold cavity, and a plurality of actuating rods connected to said piston and extending through said radially open drainage passages.

7. Molding apparatus comprising a base; a jacket positioned on said base including an outer substantially cylindrical shell and a substantially cylindrical mold liner within said shell, said shell having an opening for introduction of fluid into the jacket; a sleeve on said base under said jacket; a fluid distributing member in said sleeve; a hollow mold core mounted on said member and extending into and spaced from said liner to provide a mold cavity between it and the liner, said fluid distributing member having radial flanges forming radially open drainage passages between said flanges; means for circulating fluid through said core comprising a fluid inlet passage in said fluid distributing member open to the top thereof and to the side edge of one of said radial flanges of said member and in communication with a fluid inlet aperture in said sleeve, a fluid outlet passage open to the side edge of another radial flange of said member and in communication with an outlet aperture in said sleeve, and a pipe mounted on said member in communication with said outlet passage and extending into the inside of said core; means securing said fluid distributing member to said sleeve without blocking drainage through said radially open passages; and means for ejecting molded material from said mold cavity comprising a piston sleeve slidably mounted in said mold cavity, and a plurality of actuating rods connected to said piston sleeve and extending through said radially open drainage passages.

8. Molding apparatus comprising a base, a tubular mold member positioned on said base, a hollow mold core within said tubular mold member spaced therefrom to provide a mold cavity between it and the member, a fluid distributing member mounted on said base and connected to said core, means for conducting fluid through said core comprising a fluid inlet passage in said fluid distributing member in communication with the inside of said core and an outlet pipe on said fluid distributing member extending into the inside of said core, said base underlying an end of the mold cavity and having a plurality of drainage passages therein; and means for ejecting molded material from said mold cavity comprising a piston slidably mounted in said mold cavity, and a plurality of actuating rods extending through said drainage passages and connected to said piston, said drainage passages being materially wider throughout their length than the width of the actuating rods to provide ample open space clearances between said passages and said rods for unobstructed flow of fluid therethrough.

9. Molding apparatus comprising a base; a jacket positioned on said base including an outer substantially cylindrical shell and a substantially cylindrical mold liner within said shell; said shell having an opening for introduction of fluid into the jacket; a fluid distributing member supported by said base; a hollow mold core adjacent said fluid distributing member and extending into and spaced from said liner to provide a mold cavity between it and the liner; said base underlying an end of the mold cavity and having a plurality of arcuate drainage passages therein; means for circulating fluid through said core comprising a fluid inlet passage in said fluid distributing member open to the top and to a side thereof, and an outlet pipe on said fluid distributing member and extending into the inside of said core; and means for ejecting molded material from said mold cavity comprising a piston slidably mounted in said mold cavity, and a plurality of actuating rods extending with clearance through each of said drainage passages and connected to said piston.

10. Molding apparatus comprising a tubular mold member; a hollow mold core within said tubular mold member spaced therefrom to provide a mold cavity between it and the member; a fluid distributing member on which said core is mounted; said fluid distributing member being adjacent an end of the mold cavity and having fluid drainage passages, and also a fluid inlet passage in communication with the inside of said core and a fluid outlet passage; a pipe mounted on said fluid distributing member in communication with said outlet passage and extending into said core; and means for ejecting mold material from said mold cavity comprising a piston slidably mounted in said mold cavity, and a plurality of actuating rods connected to said piston and extending through said drainage passages; said drainage passages being materially wider throughout their length than the width of said actuating rods to provide ample open space clearances between said passages and said rods for unobstructed flow of fluid therethrough.

HARRY P. HOOPES.

References Cited in the file of this patent

UNITED STATES PATENTS

| Number | Name | Date |
|---|---|---|
| 965,005 | Pauly | July 19, 1910 |
| 965,007 | Pauly | July 19, 1910 |
| 2,211,742 | Halliwell | Aug. 13, 1940 |
| 2,389,673 | Lofdahl | Nov. 27, 1945 |
| 2,432,931 | Abrahams et al. | Dec. 23, 1947 |
| 2,483,498 | Lewon et al. | Oct. 4, 1949 |